US012541426B2

(12) United States Patent
Lien et al.

(10) Patent No.: US 12,541,426 B2
(45) Date of Patent: Feb. 3, 2026

(54) MEMORY DEVICE WITH ERROR CORRECTION CODE

(71) Applicant: Winbond Electronics Corp., Taichung (TW)

(72) Inventors: Chuen-Der Lien, Los Altos Hills, CA (US); Chi-Shun Lin, Fremont, CA (US); Ngatik Cheung, San Jose, CA (US)

(73) Assignee: Winbond Electronics Corp., Taichung (TW)

( * ) Notice: Subject to any disclaimer, the term of this patent is extended or adjusted under 35 U.S.C. 154(b) by 58 days.

(21) Appl. No.: 18/623,038

(22) Filed: Apr. 1, 2024

(65) Prior Publication Data

US 2025/0307072 A1    Oct. 2, 2025

(51) Int. Cl.
*G06F 11/10* (2006.01)
*G06F 3/06* (2006.01)

(52) U.S. Cl.
CPC ........ *G06F 11/1044* (2013.01); *G06F 3/0619* (2013.01); *G06F 3/0655* (2013.01); *G06F 3/0679* (2013.01)

(58) Field of Classification Search
None
See application file for complete search history.

(56) References Cited

U.S. PATENT DOCUMENTS 7,516,371 B2 * 4/2009 Sakaue ............... G06F 11/1068
714/763

8,495,467 B1 * 7/2013 Billing ................ G11C 29/44
714/764
9,978,462 B2 * 5/2018 Ravimohan ......... G11C 11/5642
(Continued)

FOREIGN PATENT DOCUMENTS

| CN | 107025948 | 8/2017 |
| TW | 201628012 | 8/2016 |

OTHER PUBLICATIONS

C.-Y. Chen and C.-W. Wu, "An adaptive code rate EDAC scheme for random access memory," 2010 Design, Automation & Test in Europe Conference & Exhibition (Date 2010), Dresden, Germany, 2010, pp. 735-740, (Year: 2010).*

*Primary Examiner* — Daniel F. McMahon
(74) *Attorney, Agent, or Firm* — JCIPRNET

(57) ABSTRACT

A memory device including a memory array, an ECC circuit, and a memory controller is provided. The memory array is configured to store a memory word. The memory word includes a data, at least one parity bit and a flag. The ECC circuit is configured to generate the at least one parity bit of the data, and detect and correct an error of the data read out from the memory array based on the at least one parity bit of the read data. The memory controller is coupled to the memory array. The memory controller is configured to perform a read operation to read the memory word from the memory array, and perform a program operation to program the memory word into the memory array. The memory controller is configured to determine whether the ECC circuit is enabled during the read operation or the program operation to be performed on the memory word according to the memory word. The memory word is configured to indicate a predetermined state selected from at least two states of the ECC circuit.

20 Claims, 8 Drawing Sheets

(56) References Cited

U.S. PATENT DOCUMENTS

| | | | |
|---|---|---|---|
| 2003/0093744 A1* | 5/2003 | Leung | G06F 11/1048 |
| | | | 714/E11.049 |
| 2009/0276587 A1* | 11/2009 | Moyer | G06F 11/1044 |
| | | | 711/155 |
| 2015/0100852 A1 | 4/2015 | Huang et al. | |
| 2015/0378740 A1* | 12/2015 | Moyer | G06F 11/1076 |
| | | | 712/219 |
| 2017/0315862 A1* | 11/2017 | Cideciyan | H03M 13/19 |
| 2019/0250985 A1* | 8/2019 | Seo | G06F 11/1068 |
| 2020/0192754 A1* | 6/2020 | Cho | H03M 13/1575 |
| 2024/0303158 A1* | 9/2024 | Schaefer | G06F 11/1048 |

\* cited by examiner

MEMORY DEVICE WITH ERROR CORRECTION CODE

BACKGROUND

Technical Field

The invention relates to a memory device, and in particular, it relates to a memory device with error correction code function.

Description of Related Art

Error correction code (ECC) is implemented by generating and storing parity bits used to not only identify the bit in error but also correct it. The common implementations use Hamming codes for single-bit correction and double-bit detection. Hamming codes define parity bits which cover a pre-defined set of data bits. Typically, an 8-bit hamming code is used to protect 64-bit data. The ECC verification step, using a parity-check matrix, generates a value called a syndrome. If the syndrome is zero, no error occurred. Otherwise, it is used to index a lookup table called the syndrome table to identifying the bits in error (if correctable), or otherwise determine if the error is uncorrectable. In a conventional non-volatile memory device with ECC function, many flag bits are used to indicate whether the ECC function is turned on to detect and correct errors on data during a program or read operation. However, the flag bits occupy additional area of the memory device, such that it is not conducive to the miniaturization of the area. Therefore, how to reduce the number of flag bits while maintaining good reliability for ECC non-volatile memory devices is an important issue for saving area.

Besides, ECC can improve the reliability and performance of memory systems, but they also introduce some overhead in terms of storage space, power consumption, and latency. Therefore, some applications may prefer to turn off ECC for certain words in the memory, depending on the data characteristics, the error rate, or the quality of service requirements. However, turning off ECC for some words in the memory may pose some challenges for the memory management and access. For example, how to identify which words have ECC off and which words have ECC on.

SUMMARY

The invention is directed to a memory device capable of improving its reliability and reducing power consumption.

An embodiment of the invention provides a memory device including a memory array, an ECC circuit, and a memory controller. The memory array is configured to store a memory word. The memory word includes a data, at least one parity bit and a flag. The ECC circuit is configured to generate the at least one parity bit of the data, and detect and correct an error of the data read out from the memory array based on the at least one parity bit of the read data. The memory controller is coupled to the memory array. The memory controller is configured to perform a read operation to read the memory word from the memory array, and perform a program operation to program the memory word into the memory array. The memory controller is configured to determine whether the ECC circuit is enabled during the read operation or the program operation to be performed on the memory word according to the memory word. The memory word is configured to indicate a predetermined state selected from at least two states of the ECC circuit.

DESCRIPTION OF THE EMBODIMENTS

Figure 1:
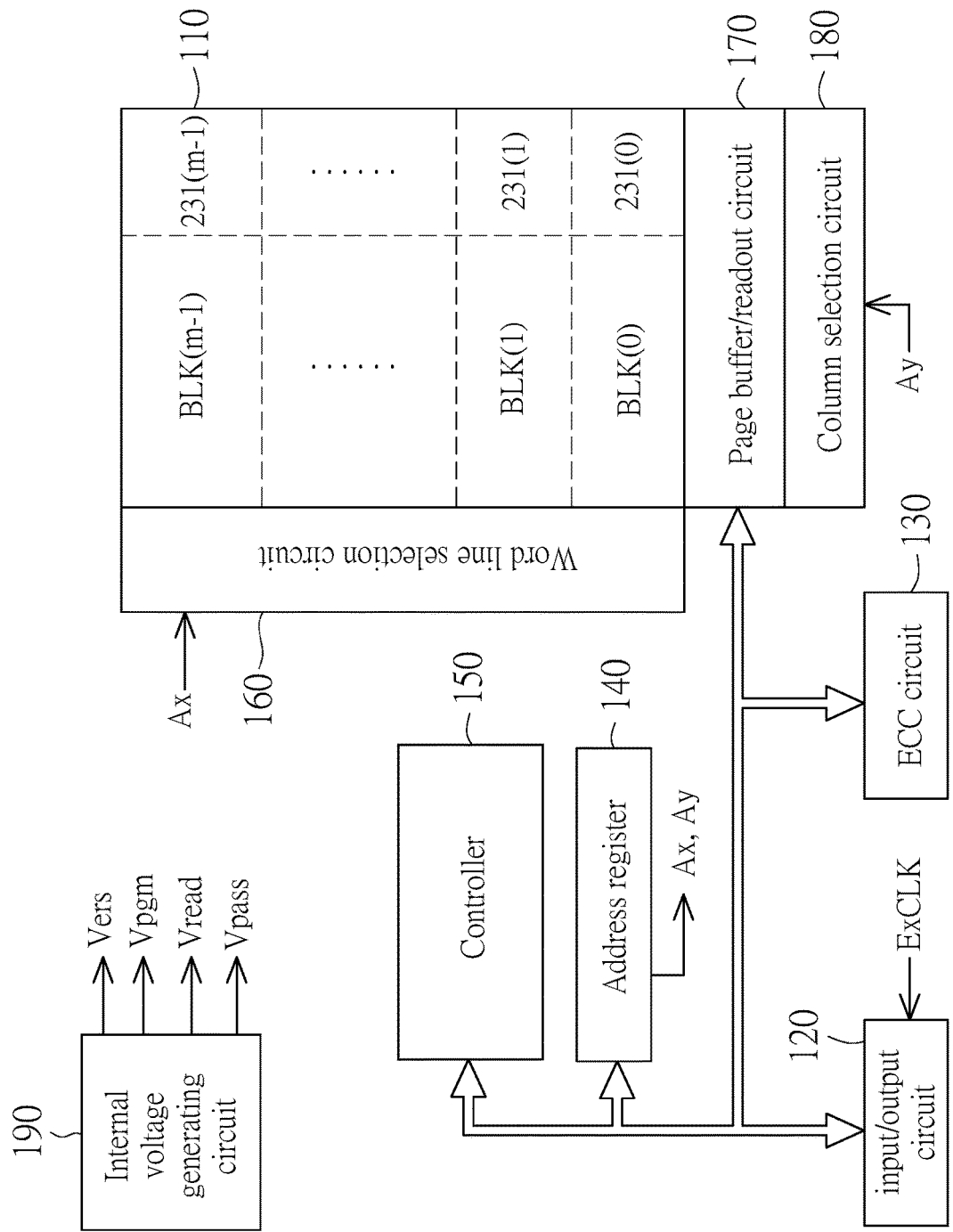
FIG. 1 illustrates a schematic diagram of a memory device according to an embodiment of the invention.

Reference will now be made in detail to the present exemplary embodiments of the invention, examples of which are illustrated in the accompanying drawings. The same reference numbers are used in the drawings and the description to refer to the same or like parts.

Figure 2:
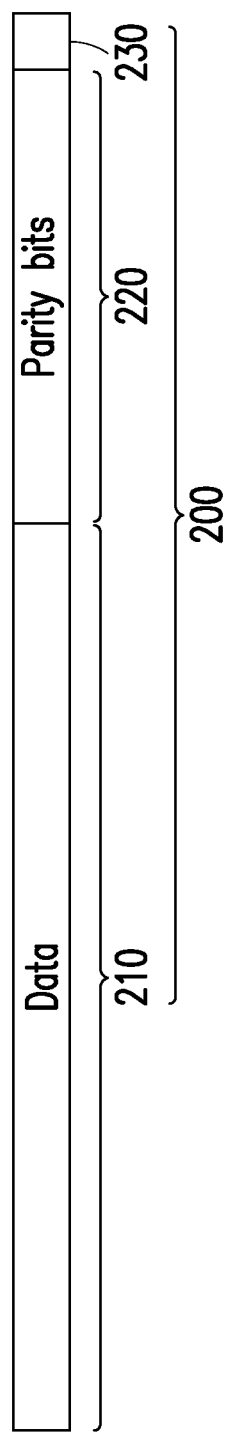
FIG. 2 illustrates a memory word according to an embodiment of the invention.

Referring to FIG. 1 and FIG. 2, the memory device 100 in the present embodiment includes a memory array 110, an input/output circuit 120, an error checking and correcting (ECC) circuit 130, an address register 140, a controller 150, a word line selection circuit 160, a page buffer/readout circuit 170, a column selection circuit 180 and an internal voltage generation circuit 190. The memory array 110 includes a plurality of memory cells arranged in a matrix. The input/output circuit 120 outputs read data to the outside, or receives data input from the outside. The ECC circuit 130 generates at least one parity bit of the received data, and detects and corrects an error of read data read out from the memory array 110 based on the parity bit(s). The address register 140 receives address data via the input/output circuit 120. The controller 150 controls various circuits in the memory device 100 based on command data received via the input/output circuit 120 or a control signal applied to the terminal. The word line selection circuit 160 receives and decodes row address information Ax from the address register 140, and selects a memory block or a word line based on a decoding result. The page buffer/readout circuit 170 holds data read from a page selected by the word line selection circuit 160, or holds data programmed into the selected page. The column selection circuit 180 receives and decodes column address information Ay from the address register 140, and performs column selection in the page buffer/readout circuit 170 based on a decoding result. The internal voltage generation circuit 190 generates various voltages (program voltage Vpgm, pass voltage Vpass, read pass voltage Vread, erase voltage Vers, etc.) required for reading, programming, erasing, etc., data. The memory array 110 includes a plurality of memory blocks BLK (0), BLK (1), . . . , BLK (m-1) arranged in a column direction.

In an embodiment, the memory device 100 may be a flash memory, but the invention is not limited thereto. The memory array 110 is configured to store memory words 200. The ECC circuit 130 may be enabled to perform an error correction operation on the memory word 200 to correct error(s) of the memory word 200. The memory word 200 comprises a data 210, at least one parity bit 220 and a flag 230 as depicted in FIG. 2. The bit numbers of the data 210, the parity bit 220 and the flag 230 are taken for example, and does not intend to limit the invention. The flag 230 may include a single bit or multiple bits. The flag 230 may be included in the error correction code or not included in the error correction code.

The memory controller 150 is coupled to the memory array 110. The memory controller 150 is configured to perform a read operation to read the memory word 200 from the memory array 110, and perform a program operation to program the memory word 200 into the memory array 110.

In the present embodiment, the memory controller 150 may be configured to determine whether the ECC circuit 130 will be enabled during the operation to be performed on the memory word 200 according to the memory word 200. In some embodiment, the memory word 200 can be configured to indicate a predetermined state selected from at least two states of the ECC circuit 130, in which the predetermined state is set based on the at least one parity bit 220 and the flag 230. In some embodiment, the at least two states may include an ECC-ON state (hereafter also called a first state) and an ECC-OFF state (hereafter also called a second state). In an embodiment, the memory controller 150 may be configured to determine a predetermined state selected from three states of the ECC circuit 130 according to the parity bit 220, the flag 230, and a data length of the data 210 of the memory word 200 to be performed the operation. The three states of the ECC circuit 130 may include the ECC-ON state, the ECC-OFF state and a standby state (hereafter also called a third state), but the invention is not limited thereto. Therefore, the error(s) in the memory word 200 is correctable when the operation is in the ECC-ON state, and unused parity bits can be used to indicate the predetermined state to improve the reliability of the memory word 200 undergone the error correction.

The hardware structure of the memory array 110 and the memory controller 150 can be understood with reference to common knowledge in the related art. The novel read and program flows of the memory word 200 with at least two states will be described as follows.

Figure 3:
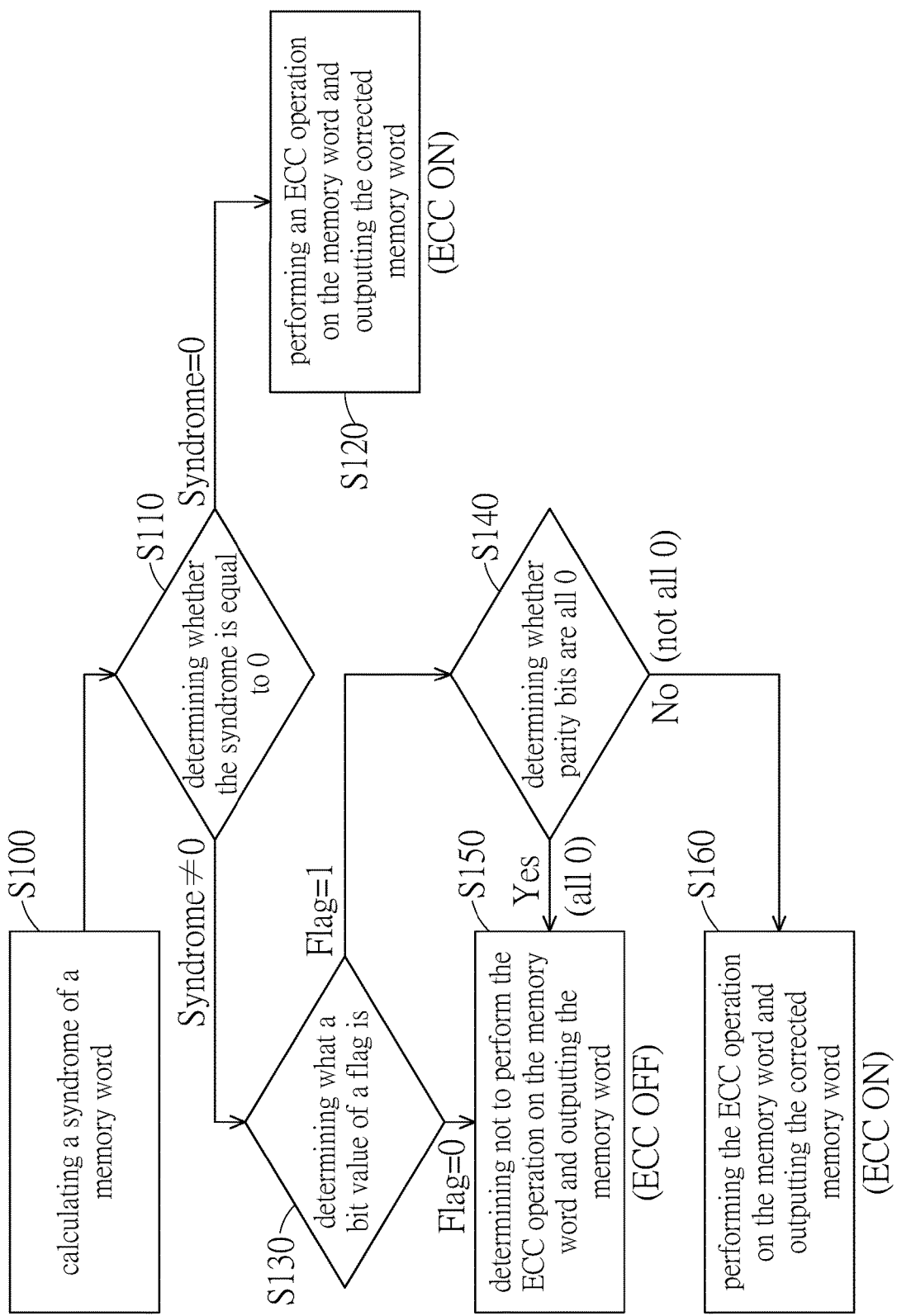
FIG. 3 is a flowchart illustrating steps in a method for reading the memory word from the memory array according to an embodiment of the invention.

Referring to FIG. 1 to FIG. 3, the memory controller 150 performs a read operation to read the memory word 200 from the memory array 110, and determines whether to perform an ECC operation on the memory word 200 according to the at least one parity bit 220 and/or the flag 230. In the present embodiment, the parity bit 220 may be multiple bits.

To be specific, in step S100, the memory controller 150 calculates a syndrome of the memory word 200 stored in the memory array 110. In step S110, the memory controller 150 determines whether the syndrome is equal to 0. The syndrome equal to 0 indicates the memory word 200 has no error. When the syndrome is equal to 0, the read flow goes to step S120. In step S120, the memory controller 150 determines to perform the ECC operation on the memory word 200 no matter what the bit value of the flag 230 is, namely, the read operation on the memory word 200 is in the ECC-ON state, and outputs the corrected memory word 200.

On the other hand, when the syndrome is not equal to 0, which indicates the memory word 200 has error(s), the read flow goes to step S130. In steps S130 and S140, the memory controller 150 determines whether to perform the ECC operation on the memory word 200 according to the parity bits 220 and/or the flag 230. In step S130, the memory controller 150 determines what the bit value of the flag 230 is. When the flag 230 has a second bit value, e.g. 0, the read flow goes to step S150. In step S150, the memory controller 150 determines not to perform the ECC operation on the memory word 200, namely, the read operation on the memory word 200 is in the ECC-OFF state, and outputs the memory word 200.

When the flag 230 has a first bit value, e.g. 1, the read flow goes to step S140. In step S140, the memory controller 150 determines whether the parity bits 220 are all 0 (the second bit value). When the parity bits 220 are all 0, the read flow goes to step S150. That is, the memory controller 150 determines not to perform the ECC operation on the memory word 200 when the flag 230 is 1 and the parity bits 220 are all 0, resulting the read operation on the memory word 200 is in the ECC-OFF state, and outputs the memory word 200.

When the parity bits 220 are not all 0, the read flow goes to step S160. In step S160, the memory controller 150 determines to perform the ECC operation on the memory word 200 when the flag 230 is 1 and the parity bits 220 are not all 0, namely, the read operation on the memory word 200 is in the ECC-ON state, and outputs the corrected memory word 200.

Figure 4:
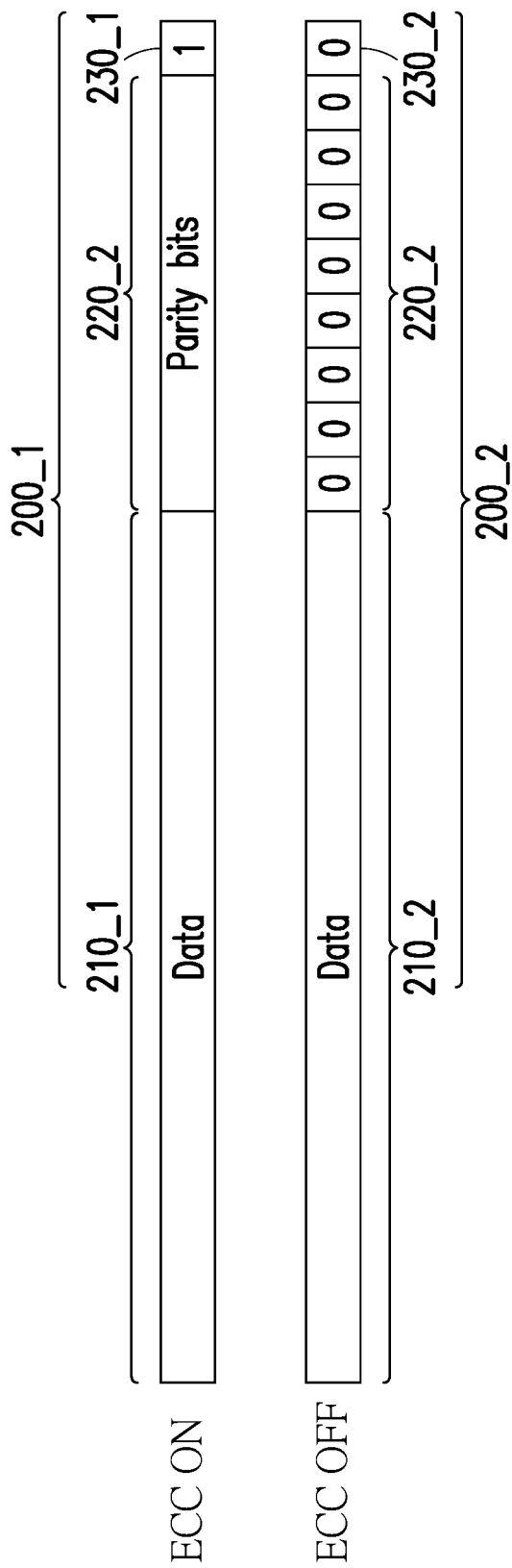
FIG. 4 illustrates memory words of two different states according to an embodiment of the invention.

FIG. 4 illustrates the read operation on the memory words resulting two different ECC states according to an embodiment of the invention. Referring to FIG. 4, after performing the read operation as shown in FIG. 3, the read operation on the memory word 200_1 results the ECC-ON state, while the read operation on the memory word 200_2 results the ECC-OFF state. Whether to turn on the ECC function while reading the memory word 200 is determined based on the at least one parity bit and the flag of the memory word 200.

For example, the memory word 200_1 has the parity bits 220_2 which are not all 0, when the syndrome is not equal to 0 and the flag 230_1 has a first bit value 1, the operation on the memory word 200_1 is set as the ECC-ON state, such that the memory word 200_1 is corrected according to an error correction code when the memory word 200_1 is read or programmed. On the other hand, the memory word 200_2 includes the parity bits 2202 programmed to a first pre-defined pattern. When the syndrome is not equal to 0 and the flag 230_2 has a second bit value of 0, the operation on the memory word 200_2 is set as the ECC-OFF state, such that the memory word 200_2 is not corrected when the memory word 200_2 is read or programmed. In the present embodiment, the first pre-defined pattern of the parity bits 220_2 is all 0 (the second bit value), but the invention is not limited thereto.

Figure 5:
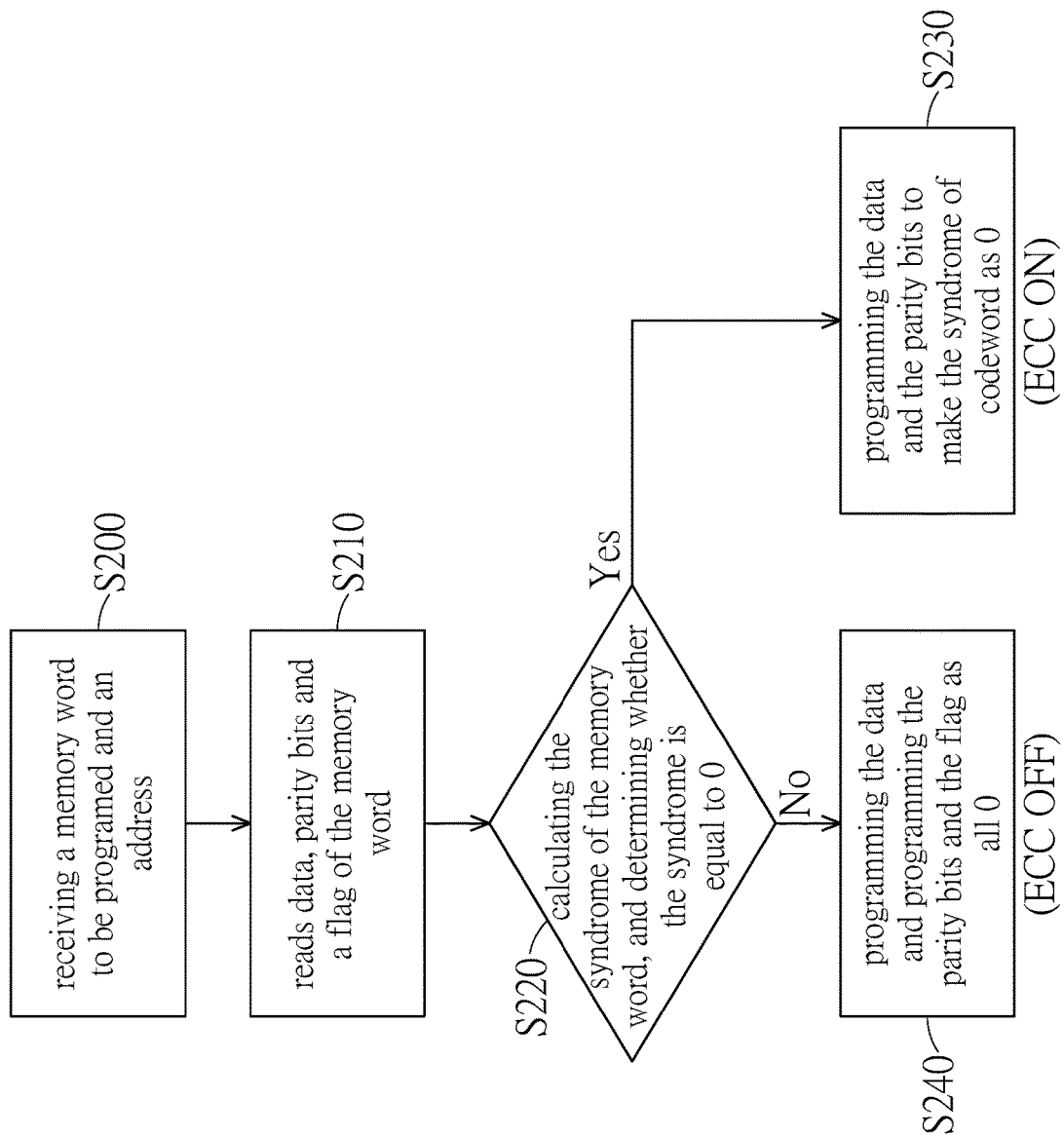
FIG. 5 is a flowchart illustrating steps in a method for programming the memory word into the memory array according to an embodiment of the invention.

FIG. 5 is a flowchart illustrating steps in a method for programming the memory word into the memory array according to an embodiment of the invention. Referring to FIG. 1, FIG. 2, and FIG. 5, the memory controller 150 performs a program operation to program the memory word 200 into the memory array 110, and set the program operation on the memory word 200 in a predetermined state according to the memory word 200.

In step S200, the memory controller 150 receives the memory word 200 to be programmed and an address. In step S210, the memory controller reads the data 210, the parity bits 220 and the flag 230 of the memory word 200. In step S220, the memory controller 150 calculates the syndrome of the memory word 200, and determines whether the syndrome is equal to 0. When the syndrome is equal to 0, the program flow goes to step S230. In step S230, the memory controller 150 enables the ECC circuit 130 and programs the data 210 and the parity bits 220 in the ECC-ON state to make the syndrome of codeword programmed in the memory array 110 as 0.

On the other hand, when the syndrome is not equal to 0, the program flow goes to step S240. In step S240, the memory controller 150 programs the data 210 and programs the parity bits 220 and the flag 230 as all 0 (as shown in the memory word 200_2 of FIG. 4), and thus the programmed memory word is programmed in the ECC-OFF state.

In an embodiment, the memory controller 150 may be configured to determine a predetermined state selected from three states of the ECC circuit 130 according to the parity bit 220, the flag 230, and a data length of the data 210 of the memory word 200 to be performed the operation. The three states may include the ECC-ON state, the ECC-OFF state and the standby state (a third state). The three states are set based on the parity bits 220, the flag 230, and a data length of the data 210.

Figure 6:
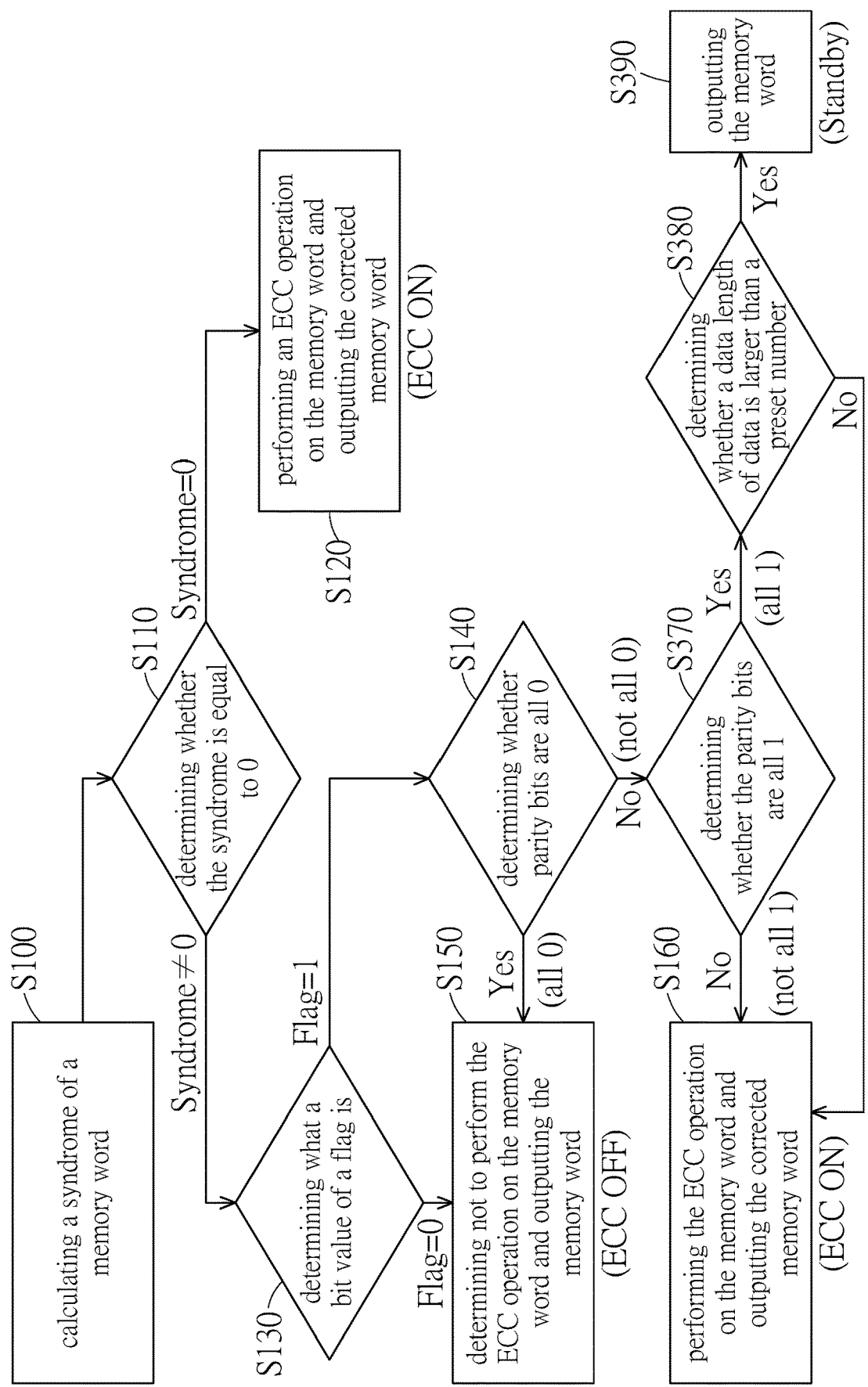
FIG. 6 is a flowchart illustrating steps in a method for reading the memory word from the memory array according to another embodiment of the invention.

To be specific, FIG. 6 is a flowchart illustrating steps in a method for reading the memory word from the memory array according to another embodiment of the invention. Referring to FIG. 1, FIG. 2 and FIG. 6, the memory controller 150 performs a read operation to read the memory word 200 from the memory array 110, and determines whether to perform the ECC operation on the memory word 200 according to the at least one parity bit 220, the flag 230, and the data length of the data 210. The data length of the data 210 is the total number of the first bit value 1 in the data 210.

The flowchart illustrated in FIG. 6 is similar to the flowchart illustrated in FIG. 3, and the main difference between them, for example, lies in that the flowchart illustrated in FIG. 6 further includes steps S370, S380 and S390 after step S140.

To be specific, in step S140, the memory controller 150 determines whether the parity bits 220 are all 0. When the parity bits 220 are all 0, the read flow goes to step S150. In step S150, the memory controller 150 determines not to perform the ECC operation on the memory word 200 when the flag 230 is 1 and the parity bits 220 are all 0, therefore the operation on the memory word 200 will be in the ECC-OFF state.

When the parity bits 220 are not all 0, the read flow goes to step S370. In step S370, the memory controller 150 determines whether the parity bits 220 are all 1 (the first bit value). When the parity bits 220 are not all 1, the read flow goes to step S160. In step S160, the memory controller 150 determines to perform the ECC operation on the memory word 200 when the flag 230 is 1 and the parity bits 220 are not all 0 and not all 1, and outputs the corrected memory word 200, namely, the operation on the memory word 200 will be in the ECC-ON state.

On the other hand, when the parity bits 220 are all 1 (a second pre-defined pattern), the read flow goes to step S380. In step S380, the memory controller 150 determines whether the data length of the data 210 is larger than a preset number. The preset number can be programmed in a mode register. The data length of the data 210 can be the total number of the first bit value 1 in the data 210.

Figure 7:
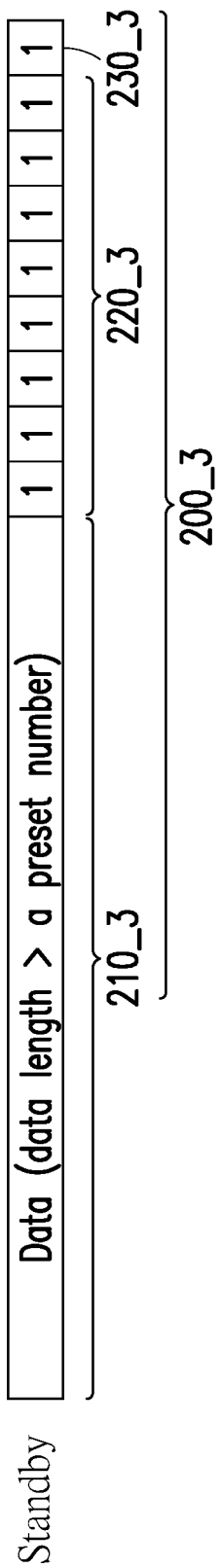
FIG. 7 illustrates a memory word of the standby state according to an embodiment of the invention.

When the data length of the data 210 is larger than the preset number, the read flow goes to step S390. In step S390, the memory controller 150 can output the memory word 200 and make the ECC circuit 130 in a standby state. FIG. 7 illustrates a memory word 200_3 indicating that the operation will be in the standby state according to the parity bits 2203, the flag 230_3, and the data length of the data 210_3.

When the data length of the data 210 is equal to or smaller than the preset number, the read flow goes to step S160.

Figure 8:
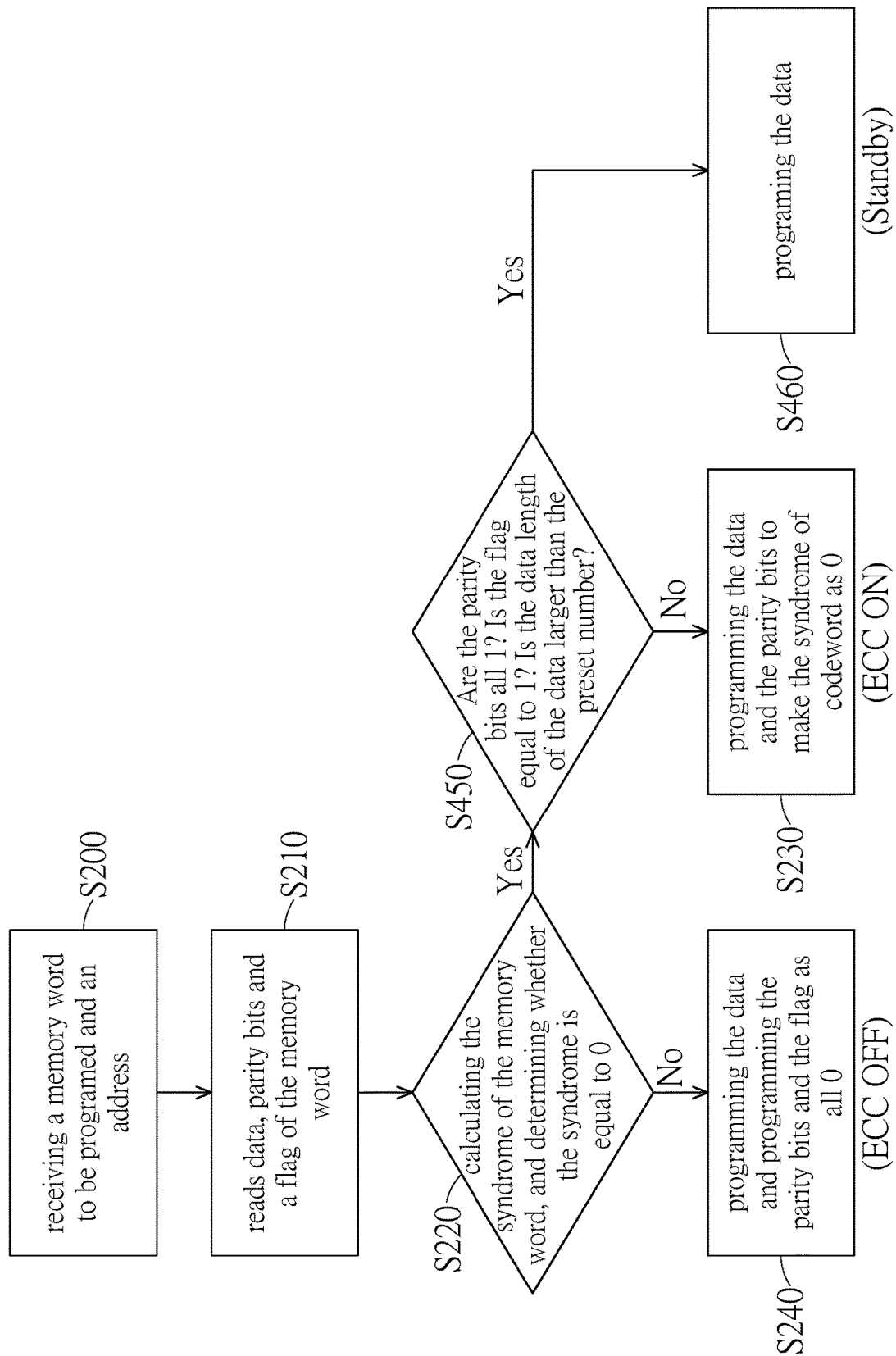
FIG. 8 is a flowchart illustrating steps in a method for programming the memory word into the memory array according to another embodiment of the invention.

FIG. 8 is a flowchart illustrating steps in a method for programming the memory word into the memory array according to another embodiment of the invention. Referring to FIG. 5 and FIG. 8, the memory controller 150 performs a program operation to program the memory word 200 into the memory array 110 and set the program operation on the memory word 200 as a predetermined state selected from three states according to the at least one parity bit 220, the flag 230, and the data length of the data 210.

The flowchart illustrated in FIG. 8 is similar to the flowchart illustrated in FIG. 5, and the main difference therebetween, for example, lies in that the flowchart illustrated in FIG. 8 further includes steps S450 and S450 after the step S220.

In step S220, the memory controller 150 calculates the syndrome of the memory word 200, and determines whether the syndrome is equal to 0. When the syndrome is equal to 0, the program flow goes to step S450. In step S450, the memory controller 150 sets the program operation on the memory word 200 in the ECC-ON state or the standby state according to the parity bits 220, the flag 230, and the data length of the data 210.

When the parity bits 220 are all 1, the flag 230 is equal to 1, and the data length of the data 210 is larger than the preset number, the program flow goes to step S460. In step S460, the memory controller 150 programs the data 210 and makes the ECC circuit 130 in the standby state.

When one of conditions that the parity bits 220 are all 1, the flag 230 is equal to 1, and the data length of the data 210 is larger than the preset number is not met, the program flow goes to step S230. In step S230, the memory controller 150 enables the ECC circuit 130 and programs the data 210 and the parity bits 220 in the ECC-ON state to make the syndrome of codeword programmed in the memory array 110 as 0.

In the embodiments of FIG. 1 to FIG. 8, the flag of the memory word is one bit and configured to indicate the predetermined state of the operation on the memory word, but the invention is not limited thereto. In an embodiment, the flag may be implemented as multiple block flags each is pre-assigned to a corresponding one of the memory blocks BLK (0), BLK (1), . . . , BLK (m-1) of the memory array 110.

To be specific, referring to FIG. 1 again, the memory array 110 may store a plurality of block flags 231 (0)~231 (m-1). The block flags 231 (0)~231 (m-1) may be error correctable. Each of the block flags 231 (0)~231 (m-1) is pre-assigned to the corresponding memory block BLK (0), BLK (1), . . . , BLK (m-1) of the memory array 110. Each of the block flags 231 (0) 231 (m-1) includes a single bit or multiple bits. The block flags 231 (0)~231 (m-1) indicate whether the memory words 210 of the corresponding memory blocks BLK (0), BLK (1), . . . , BLK (m-1) are corrected when the memory words are read or programmed.

For example, when the block flag 231 (0) has the first bit value, the operation on the memory words of the memory block BLK (0) is set as the first state. The first state indicates that the memory words will be corrected according to an error correction code when the memory words are read or programmed.

When the block flag 231 (0) has the second bit value, the operation on the memory words of the memory block BLK (0) is set as the second state. The second state indicates that the memory words will not be corrected when the memory words are read or programmed.

In summary, in the embodiment of the invention, a predetermined state of the ECC operation on the memory words can be set according to a flag bit and parity bits to improve reliability of the memory device. For the case of a single flag bit, the number of flag bits is reduced while a good reliability of the memory device can be maintained. In addition, unused parity bits are also used to set the predetermined state of the ECC operation on the memory words, so as to improve reliability and is conducive to the miniaturization of the memory device.

The present invention is suitable for making miniaturized memory device with ECC function, so as to increase the total number of dies on a wafer. Therefore, the production cost and energy consumption of manufacturing a single IC are reduced, and the production energy consumption of subsequent packaging is also reduced, thereby reducing carbon emissions in the process of producing memory device. Besides, since reliability of the memory device of the present invention is improved, and the power consumption is reduced, the present invention provides a sustainable and eco-friendly memory device.

Furthermore, the memory devices of the present disclosure may be used on automotive electronics, such as Advanced Driver Assistance Systems (ADAS), Instrument Clusters, Infotainment in an electric vehicle. The memory devices of the present disclosure may be used on space constrained applications including Wearable, MP3 players, smart watches, games, digital radio, toys, cameras, digital photo album, GPS, Bluetooth and WiFi modules. The memory devices of the present disclosure may be used on IoT and mobile electronic devices.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory device, comprising:
    a memory array, configured to store a memory word, wherein the memory word comprises a data, at least one parity bit and a flag;
    an ECC circuit, configured to generate the at least one parity bit for the data, and detect and correct an error of the data read out from the memory array based on the at least one parity bit for the read data; and
    a memory controller, coupled to the memory array and configured to perform a read operation to read the memory word from the memory array, and perform a program operation to program the memory word into the memory array,
    wherein during the program operation, the memory controller is configured to program the memory word such that the ECC circuit will be in a predetermined state selected from at least two states when the memory word is subsequently read, and during the read operation, determine the predetermined state of the ECC circuit according to the at least one parity bit and the flag of the memory word.

2. The memory device of claim 1, wherein the at least two states comprise an on state and an off state, the on state indicates that an error in the memory word is corrected according to an error correction code when the memory word is read, and the off state indicates that the error in the memory word is not corrected when the memory word is read.

3. The memory device of claim 1, wherein during the program operation, the memory controller is configured to calculate a syndrome of the memory word and determine whether the syndrome is equal to 0; in response to determining that the syndrome of the memory word is equal to 0, program the memory word into the memory array.

4. The memory device of claim 2, wherein during the read operation, the memory controller is configured to:
    determine whether a syndrome of the memory word is not equal to 0;
    in response to determining that the syndrome of the memory word is not equal to 0, determine whether the flag has a first bit value, and whether the at least one parity bit of the memory word is all a second bit value different from the first bit value,
    in response to determining that the at least one parity bit of the memory word are not all the second bit value, determine the predetermined state of the ECC circuit as the on state.

5. The memory device of claim 2, wherein the program operation includes:
    calculating a syndrome of the memory word and determining whether the syndrome is equal to 0;
    in response to determining that the syndrome of the memory word is not equal to 0, program the memory word such that the at least one parity bit and the flag form a first pre-defined pattern, thereby setting the predetermined state of the ECC circuit to the off state.

6. The memory device of claim 5, wherein the first pre-defined pattern is all zero.

7. The memory device claim 4, wherein during the read operation, the memory controller is configured to:
    when the at least one parity bit of the memory word is all the second bit value, determine the predetermined state of the ECC circuit as the off state.

8. The memory device of claim 3, wherein in the program operation, the memory controller programs the data and the at least one parity bit to make the syndrome of a codeword programmed in the memory array as 0.

9. The memory device of claim 3, wherein in the program operation, when the syndrome of the memory word is not equal to 0, the memory controller is configured to program the data, and program the at least one parity bit and the flag as all 0.

10. The memory device of claim 2, wherein the at least two states further comprise a standby state, and during the read operation, the memory controller is configured to determine the predetermined state of the ECC circuit based on the at least one parity bit, the flag, and a data length of the data.

11. The memory device of claim 10, wherein the data of the memory word includes a bit value having a first logic state, and the data length of the data is a total number of the bit value having the first logic state in the data.

12. The memory device of claim 10, wherein during the read operation, the memory controller is configured to;
    calculate a syndrome of the memory word and determine whether the syndrome is equal to 0,
    in response to determining that the syndrome of the memory word is not equal to 0, determine whether the flag has a first bit value, whether the at least one parity bit has a second pre-defined pattern, and whether the data length of the data is larger than a preset number, and in response to determining that the flag has the first bit value, the at least one parity bit has the second pre-defined pattern and the data length of the data is larger than the preset number, determine the predetermined state of the ECC circuit as the standby state.

13. The memory device of claim 12, wherein the second pre-defined pattern is all the first bit value.

14. The memory device of claim 12, wherein during the read operation, the memory controller is configured to:
  determine whether the at least one parity bit of the memory word is all a second bit value different from the first bit value of the flag,
  in response to determining that the at least one parity bit of the memory word is not all the second bit value, determine whether the at least one parity bit of the memory word is all the first bit value,
  in response to determining that the at least one parity bit of the memory word is all the first bit value, determine whether the data length of the data is larger than the preset number,
  in response to determining that the data length of the data is not larger than a preset number, determine the predetermined state of the ECC circuit as the on state.

15. The memory device of claim 12, wherein during the program operation, the memory controller is configured to:
  calculate the syndrome of the memory word and determine whether the syndrome is equal to 0,
  in response to determining that the syndrome of the memory word is equal to 0, determine whether the at least one parity bit is all 1, the flag has the first bit value, and the data length of the data is larger than the preset number, and in response to determining that the at least one parity bit is not all 1, the flag does not have the first bit value, or the data length of the data is not larger than the preset number, program the memory word into the memory array.

16. The memory device of claim 12, wherein during the read operation, the memory controller is configured to:
  in response to determining the at least one parity bit is not all 1, or the data length of the data is not larger than the preset number, determine the predetermined state of the ECC circuit as the on state.

17. The memory device of claim 1, wherein the flag is included in an error correction code.

18. The memory device of claim 2, wherein the memory array comprises a plurality of blocks and configured to store a plurality of block flags, and each of the block flags is pre-assigned to the corresponding block of the memory array,
  wherein the block flags indicate the predetermined state of the ECC circuit when the memory words of the corresponding blocks are read.

19. The memory device of claim 18, wherein when the block flag has a first bit value, the predetermined state of the ECC circuit is determined as the on state when the memory words of the corresponding blocks are read,
  when the block flag has a second bit value different from the first bit value, the predetermined state of the ECC circuit is determined as the off state when the memory words of the corresponding blocks are read.

20. The memory device of claim 18, wherein the block flags are error correctable.

* * * * *